May 26, 1959  R. S. POLLOCK  2,888,243
COOLED TURBINE BLADE

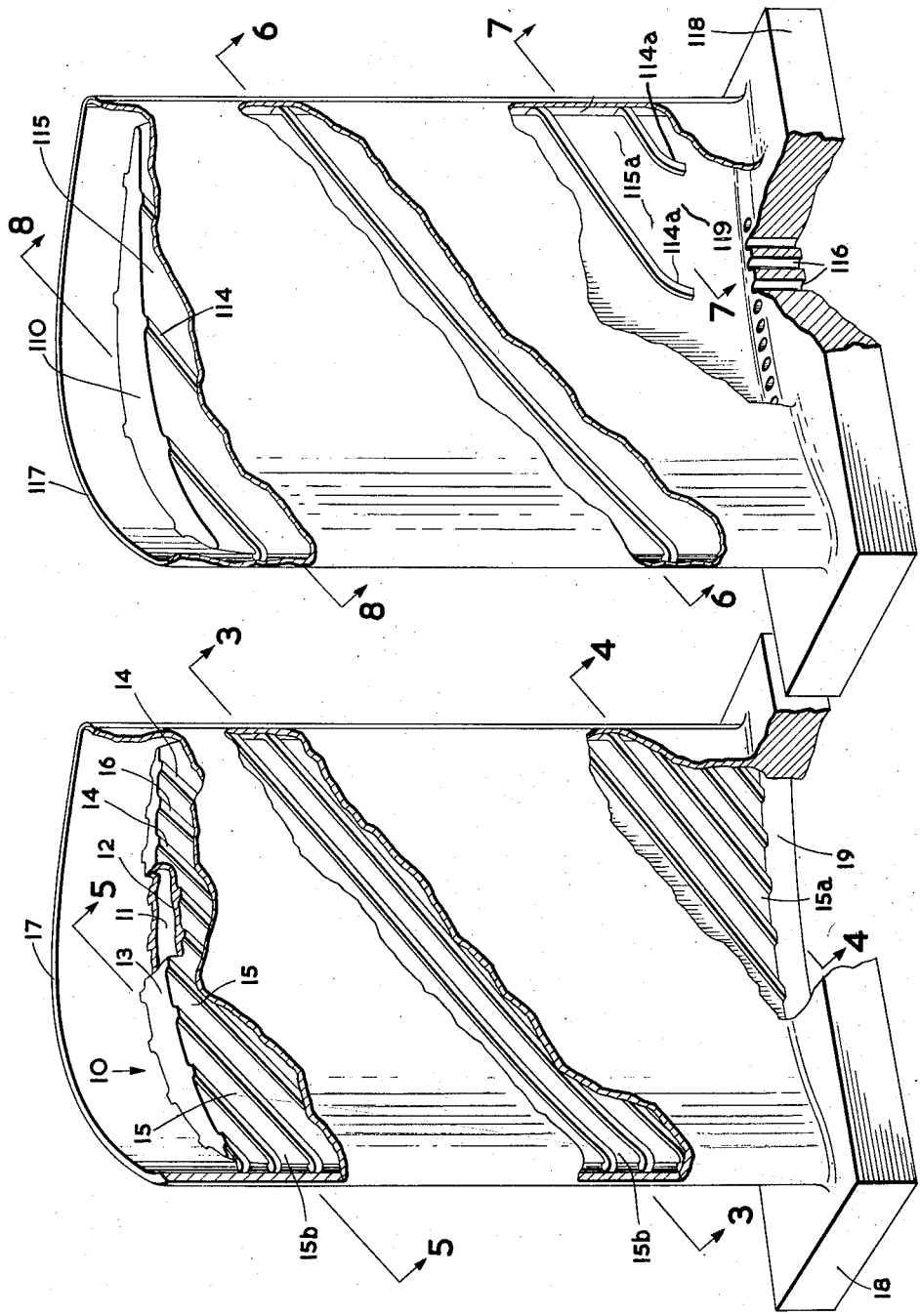

Filed Oct. 22, 1956  3 Sheets-Sheet 2

INVENTOR
R. S. POLLOCK
BY: Maybee & Legris
ATTORNEYS

May 26, 1959  R. S. POLLOCK  2,888,243
COOLED TURBINE BLADE
Filed Oct. 22, 1956  3 Sheets-Sheet 3

INVENTOR
R. S. POLLOCK
BY: Maybee & Legris
ATTORNEYS

United States Patent Office 2,888,243
Patented May 26, 1959

2,888,243

COOLED TURBINE BLADE

Robert Stephen Pollock, East Dearborn, Mich.

Application October 22, 1956, Serial No. 617,657

2 Claims. (Cl. 253—39.15)

This invention relates to gas turbine engines and in particular to blades used in the compressor and turbine stages of such gas turbine engines.

Modern gas turbine engines of the type which are used to power jet aircraft operate at temperatures and angular velocities which are such that light weight cooled blades are required for their efficient operation. Lightness in weight may readily be obtained by fabricating the blade from sheet metal. Sheet metal blades also offer advantages in respect of cooling the skin of the blade since their construction provides hollow portions within the blade through which a cooling fluid may be passed either under the influence of centrifugal force exerted by the rotating blade in the case of a rotor blade or by a pressure differential in the case of a stator blade.

As has been suggested, cooled sheet metal gas turbine blades are already well known in certain forms. There has been proposed, for example, a sheet metal blade which consists of only a reinforced metal shell through which a stream of air is passed to cool the blade. A gas turbine blade has, over its surface, a series of "hot spots" and "cool spots," and this type of construction does not distinguish between these areas to cool the hot spots to a greater extent than it does the cool spots. As a result, the temperature gradient over the blade is not reduced and the differential in temperature results in blade warpage and ultimate damage.

In an attempt to correct this fault, blades were proposed which were provided with a central core which was either hollow or solid and which had grooves formed in its outer surface to define a series of flow passages which lay parallel to the longitudinal axis of the blade. A sheet metal skin was placed over the core to provide a smooth aero-dynamic surface and to enclose the grooves to form enclosed passages. This construction, while it enabled the grooves to be positioned so as to give the hot spots the benefit of greater cooling over the cool spots, suffered from peculiar disadvantages of its own. Firstly, the passages extended in a radial direction relative to the rotation of the engine and, in the case of rotor blades, the centrifugal force would cause the air to flow too rapidly to effect efficient cooling. Secondly, because the distance from the root to the tip of the blade is shortest along a line parallel to the longitudinal axis of the blade, the grooves had to be made with a very small cross-sectional area so as to restrict the flow of air and to maintain the ratio of passage length to cross-sectional area within limits that provide a satisfactory rate of heat transfer. The manufacture of a blade core having such fine grooves presents problems particularly when the core is made from sheet metal. A solid core is relatively easy to groove but is much heavier. A further serious problem resides in the preventing of the brazing material which secures the skin to the core from filling up and plugging the grooves when the skin is applied to the core.

With these problems in mind the present invention was evolved which has as its principal object the provision of a cooled gas turbine blade in which the rate of heat transfer is improved and which is simple to manufacture.

A further object of this invention is to produce a cooled gas turbine blade which will provide for increased rate of heat transfer at the "hot spot" areas.

According to the invention a gas turbine blade of the nature described comprises a core and a skin surrounding the core, helical ridges on one of the adjacent surfaces of the core and skin to define helical grooves therebetween, each groove commencing near the root of the blade and terminating near the tip to provide a helical passage for cooling fluid.

Two embodiments of the invention are illustrated in the accompanying drawings in which like reference numerals refer to like parts in the various views and in which:

Figure 1 is a perspective view of a gas turbine blade made in accordance with the invention with the skin partly cut away to show the internal construction;

Figure 2 is a view similar to Figure 1 showing a second embodiment of the invention;

Figure 3:
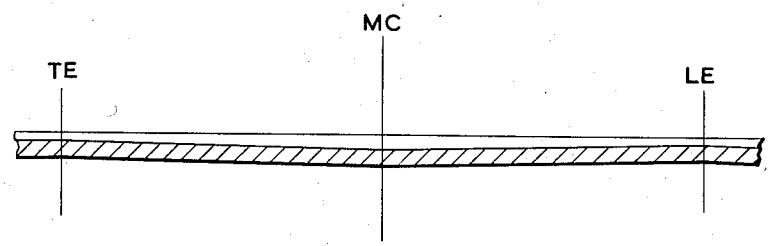
Figure 3 is a partial section along line 3—3 of Figure 1.

Referring now to Figure 1 of the drawings in which one embodiment of the invention is illustrated, the blade will be seen to consist of a hollow core 10 having walls 11 and 12. The core is of substantially areofoil cross-section and the ends of the core may be closed as shown at 13. The end of the core adjacent the tip of the blade may be left open if desired but the end of the core adjacent the root of the blade should be closed for a purpose which will be more fully described hereinafter. The external surface of the core 10 is provided with a series of parallel, helical ridges 14 extending around the core, each ridge commencing at one end of the core and terminating at the other end. The ridges 14 define therebetween a series of helical grooves 15 which also extend around the core commencing at one end and terminating at the other end.

The ridges 14 have flattened outwardly facing surfaces 16 which, for all the ridges, lie in a common plane so that when the skin 17 of the blade is placed around the core the surface 16 of every ridge 14 will lie against the blade skin throughout its entire extent. In this manner the skin 17 of the blade may be brazed to the core along the entire length of every ridge 14 to ensure that an extremely rigid and sturdy structure will result. The skin 17 of the blade will define, with each pair of ridges 14, an enclosed passage through which cooling fluid may pass. The blade skin 17 is secured, adjacent the root of the blade, to a root block 18 which may be of any convenient shape or size to enable it to be readily secured to the mounting structure within the engine in which it is to be used. The root block 18 will have an opening 19 through which cooling fluid may be admitted to the interior of the blade.

The lower end of the blade core 10 will be closed so that no cooling fluid may enter the interior of the blade core and all the cooling fluid will be required to pass through the helical passages provided by the helical ridges and the skin. It will be seen, therefore, that cooling fluid entering passage 15a will travel along the passage until it substantially reverses its direction at the leading edge of the blade. It will then pass entirely across the convex side of the blade at an angle to the longitudinal axis of the blade until it substantially reverses its direction once more as it passes around the trailing edge of the blade. The cooling fluid will then, following passage 15b pass along at least part of the concave surface of the blade until it leaves the passage adjacent the tip of the blade.

As has been explained before the surface of a gas turbine blade has "hot spots" and "cool spots." The hot portions of the blade customarily are located adjacent the leading and trailing edges. As a result it is desirable to design the blade so that a higher rate of heat transfer will be obtained at these hot portions with a lesser degree of heat transfer at the cooler portions so that the blade as a whole may be maintained at as close to a uniform temperature as is practical.

Figure 4:
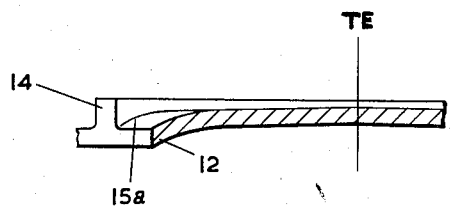
Figure 4 is a partial section along line 4—4 of Figure 1.
Figure 5:
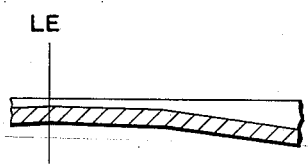
Figure 5 is a partial section along line 5—5 of Figure 1.

Referring now to Figures 3, 4 and 5 which are sections taken along lines 3—3, 4—4 and 5—5 respectively of Figure 1 the cross-sectional area of the passage can be seen to vary in accordance with its position relative to the blade as a whole. Considering first of all Figure 4 it will be seen that the depth of the passage at the entrance thereto is considerably greater than at a point slightly removed from the entrance. This enables air to enter the passage easily and it will be seen that at a point indicated by the line TE the passage has reached its minimum depth. It will be appreciated that since a constant volume of air is flowing through the passage those portions of the passage which have the smallest cross-sectional area will have the highest rate of heat transfer. The point indicated by the line TE lies at the trailing edge of the blade shown in Figure 1 and, accordingly, this "hot spot" will receive the maximum benefit of the cooling fluid.

Referring now to Figure 3 that portion of the passage which lies across the blade from leading to trailing edge (in Figure 3) or from trailing to leading edge may be seen. The section of the passage indicated by the line bearing reference character TE represents that portion of the passage lying at the trailing edge while the line bearing reference character LE indicates that portion of the passage lying adjacent the leading edge. The line bearing the reference character NC indicates the portion of the passage at the mid-chord region of the blade. The mid-chord region of the blade is one of the "cool spots" and, accordingly, the depth of the passage is increased at this point to allow the air to pass more freely along the passage and to lower the rate of heat transfer relative to the rate of heat transfer which is being obtained at the leading and trailing edges.

Referring now to Figure 5 the depth of the passage may be seen to increase once more at the end of the passage so as to provide a diffusing effect for the cooling air as it leaves the passage.

By placing Figures 4, 3 and 5 in end to end relationship in that order the developed passage will be seen to commence with a fairly large depth which is reduced to a minimum depth at the point where the passage passes around the trailing edge. The passage depth increases steadily to the mid-chord region where it begins to decrease once more towards the leading edge of the blade where it again reaches a minimum depth. From the leading edge to the exit of the passage the depth increases gradually and then relatively sharply to form a diffusing area immediately adjacent the exit of the passage.

Figure 6:
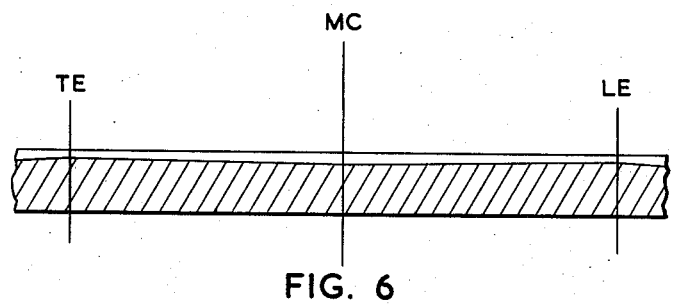
Figure 6 is a partial section along line 6—6 of Figure 2.
Figure 7:
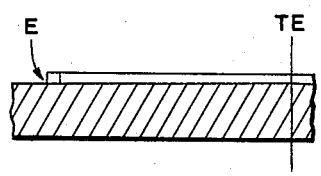
Figure 7 is a partial section along line 7—7 of Figure 2.
Figure 8:
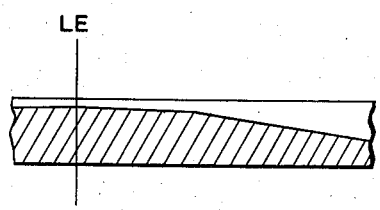
Figure 8 is a partial section along line 8—8 of Figure 2.

Referring now to Figures 2, 6, 7 and 8 a second embodiment of the invention will be seen to comprise a solid core 110 which is provided with ridges 114 defining grooves 115 therebetween. A skin 117 surrounds the core and defines passages 115a with the grooves 115. The construction in this embodiment is substantially identical to that disclosed in relation to the previous embodiment except that here it has been found convenient to provide the grooves 114 with radiused portions 114a adjacent the root of the blade to receive air from a series of holes 116 drilled through the root block 118. As the air enters the gap or space 119 between the ends 114a of the ridges 114 and the root 118, it is directed into the passage 115a by means of the radiused portions 114a of the ridges 114. The passage depth in this embodiment varies in a manner similar to that disclosed with respect to the first embodiment, the entrance to the passage 115a being slightly deeper as indicated by the reference character E in Figure 7 than the passage depth at the trailing edge indicated by the reference character TE in Figure 7. In Figure 6 the passage depth will be seen to increase steadily from the trailing edge to the mid-chord region indicated by the reference characters TE and MC respectively and the passage depth decreases steadily from the mid-chord region to the leading edge as indicated by the reference character LE in Figure 6. From the leading edge to the exit of the passage the passage depth increases gradually and then sharply to form a diffusing area immediately adjacent the exit of the passage.

In operation the function of the two embodiments is substantially identical.

Cooling fluid is admitted to the blade through the opening 19 in the embodiment illustrated in Figure 1 or through holes 116 in the embodiment illustrated in Figure 2 and enters the passages 15a or 115a. The pressure of the air supplied to the blade and the centrifugal force imposed upon the blade due to its rotation within the engine will cause the air to move from the root of the blade towards the tip. The air will be subjected to extreme turbulence due to the fact that it is passing through helical passages rather than through radial passages under the influence of the centrifugal force. This turbulence in the air will cause the cooling fluid to scrub against the metal surfaces to increase the rate of heat transfer. The varying depth of the passages will cause a higher rate of heat transfer at the points where the passage depth is smallest and thereby raise the rate of heat transfer at the desired points.

The fact that the cooling passages extend helically around the blade core enables them to be of a considerably greater length than if they were parallel to the longitudinal axis of the core and, as a result, the same rate of heat transfer may be maintained as would be obtained with a straight line passage of much smaller cross-sectional area. This facilitates the manufacture of the blade core with the ridges and grooves and greatly simplifies the operation of producing a light weight cooled blade.

While the invention has been described in considerable detail with respect to two preferred embodiments it is to be appreciated that minor modifications can be made within the scope of the appended claims without departing from the spirit of the invention.

What I claim as my invention is:

1. A gas turbine blade comprising a core, a plurality of parallel, helical ridges formed on the core to define a plurality of helical grooves therebetween, a skin surrounding the core and secured along the entire length of the crest of each ridge to define with the grooves a plurality of helical passages for cooling fluid, each groove commencing near the root of the blade and terminating near the tip, each groove being of a greater depth at the mid-chord region of the blade than at the leading and trailing edge.

2. A gas turbine blade comprising a core, a plurality of parallel, helical ridges formed on the core to define parallel, helical grooves therebetween, each ridge having a flattened crest, a smooth, impervious skin surrounding the core and in abutment with the crest of each ridge along its entire length and secured thereto, each groove commencing near the root of the blade and terminating near the tip and crossing at least one of the leading and trailing edges of the blade, the cross-sectional area of each groove being greater near the mid-chord region of the blade than near the leading and trailing edge and the cross-sectional area at the beginning and end of the groove being greater than at the mid-chord region.

References Cited in the file of this patent

UNITED STATES PATENTS

| | | |
|---|---|---|
| 2,520,751 | Zucrow | Aug. 29, 1950 |
| 2,647,368 | Thriebbnigg | Aug. 4, 1953 |
| 2,700,530 | Williams | Jan. 25, 1955 |